(12) United States Patent
Kaneshige et al.

(10) Patent No.: US 8,924,069 B1
(45) Date of Patent: Dec. 30, 2014

(54) ARTIFICIAL IMMUNE SYSTEM APPROACH FOR AIRBORNE VEHICLE MANEUVERING

(75) Inventors: John T. Kaneshige, Fremont, CA (US); Kalmanje S. Krishnakumar, Cupertino, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 1554 days.

(21) Appl. No.: 12/100,378

(22) Filed: Apr. 9, 2008

(51) Int. Cl.
*G05D 1/12* (2006.01)

(52) U.S. Cl.
USPC .................. 701/27; 701/23; 701/25; 701/26

(58) Field of Classification Search
USPC ........ 89/1.11; 700/245, 247, 248, 249; 701/3, 701/23, 24, 75, 213, 301, 25, 26, 27, 300, 701/302, 528; 703/8; 706/13, 12
See application file for complete search history.

(56) References Cited

U.S. PATENT DOCUMENTS

| | | | | | |
|---|---|---|---|---|---|
| 4,674,710 | A | * | 6/1987 | Rodriguez | 244/76 R |
| 5,521,817 | A | * | 5/1996 | Burdoin et al. | 701/3 |
| 5,728,965 | A | * | 3/1998 | Fesland et al. | 89/1.11 |
| 6,459,411 | B2 | * | 10/2002 | Frazier et al. | 342/455 |
| 7,039,367 | B1 | * | 5/2006 | Kucik | 455/96 |
| 2005/0004723 | A1 | * | 1/2005 | Duggan et al. | 701/24 |
| 2005/0055143 | A1 | * | 3/2005 | Doane | 701/30 |
| 2005/0219113 | A1 | * | 10/2005 | Rowlan | 342/29 |
| 2007/0021880 | A1 | * | 1/2007 | Appleby et al. | 701/23 |
| 2007/0067050 | A1 | * | 3/2007 | Fregene et al. | 700/31 |
| 2009/0118875 | A1 | * | 5/2009 | Stroud | 701/3 |

OTHER PUBLICATIONS

Kaneshige, et al, Tactical Maneuvering Using Immunize . . . , AIAA 'Unmanned Unlimited' Systems Technologies, & Operations-Aerospace, Land, and Sea, Sep. 15-18, 2003, San Diego, CA.
Kaneshige, et al, Tactical Immunized Maneuvering System for Exploration Air Vehicles, Infotech@Aerospace, Sep. 26-29, 2005, Arlington, VA, AIAA.
Krishnakumar, Artifical Immune System Approaches for Aerospace Applications, Aerospace Sciences Meeting and Exhibit, Jan. 6-9, 2003, Reno, Nevada, AIAA.

* cited by examiner

*Primary Examiner* — Stephen Holwerda
(74) *Attorney, Agent, or Firm* — John F. Schipper; Robert M. Padilla

(57) ABSTRACT

A method and system for control of a first aircraft relative to a second aircraft. A desired location and desired orientation are estimated for the first aircraft, relative to the second aircraft, at a subsequent time, $t=t2$, subsequent to the present time, $t=t1$, where the second aircraft continues its present velocity during a subsequent time interval, $t1 \le t \le t2$, or takes evasive action. Action command sequences are examined, and an optimal sequence is chosen to bring the first aircraft to the desired location and desired orientation relative to the second aircraft at time $t=t2$. The method applies to control of combat aircraft and/or of aircraft in a congested airspace.

5 Claims, 15 Drawing Sheets

Maneuver Selection
☐ Genetic Representation of a Maneuver
- Autopilot commands are expressed in terms of a binary string, which is stored in a 32-bit word.
- Multiple binary strings are linked together to form more complicated maneuvers
- A maximum of 10 autopilot commands were allowed per maneuver.
☐ Maneuver Generation
- Constructed through the random generation and concatenation of autopilot commands and manually constructed Basic Flight Maneuvers.

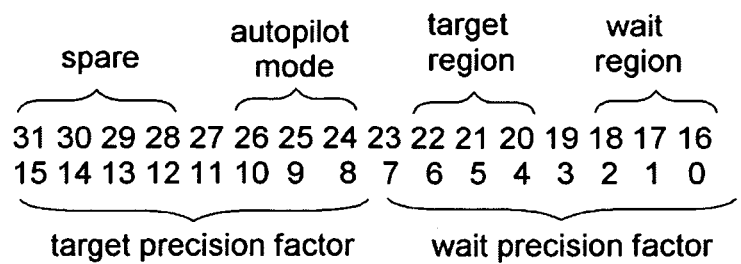

ARTIFICIAL IMMUNE SYSTEM APPROACH FOR AIRBORNE VEHICLE MANEUVERING

ORIGIN OF THE INVENTION

This invention was made, in part, by one or more employees of the U.S. government and may be made, used and/or sold by the U.S. government without payment of royalties or other compensation thereon.

FIELD OF THE INVENTION

This invention relates to control and maneuvering of an airborne vehicle in the presence of other airborne vehicles.

BACKGROUND OF THE INVENTION

Unmanned Aerial Vehicles (UAVs) have been demonstrated to be effective platforms for performing missions requiring long endurance flight and operating in areas that may be too dangerous for human-operated AVs. As the role of UAVs expands, from remotely controlled to semi-autonomous and autonomous operations, challenges are presented that require the development and application of intelligent systems. These systems must be capable of making reliable decisions under varying conditions. As a result, a UAV system must incorporate aspects of the experience, reasoning and learning abilities of a pilot. A high level of autonomy is desired for future unmanned combat systems because lethality and survivability can be improved with much less communications bandwidth than is required for preprogrammed or remotely operated systems.

What is needed is an autonomous aircraft control system that (1) senses a present configuration of the subject aircraft and one or more other aircraft in the neighborhood (referred to collectively as "intruder aircraft,") (2) quickly examines a plurality of response scenarios; (3) identifies at least one optimal response scenario, depending upon whether the intruder aircraft is non-friendly (a suitable firing position sought) or is friendly (avoidance is pursued); and (4) promptly implements the optimal response scenario.

SUMMARY OF THE INVENTION

These needs are met by the invention, which provides a method including: (1) providing a first airborne aircraft with information on location and on velocity of at least a second airborne aircraft relative to the first aircraft; (2) estimating a desired location and orientation of the first aircraft relative to the second aircraft at a time, $t=t2$ (unspecified), subsequent to the present time, $t=t1$, where the second aircraft is assumed to continue at its present flight configuration (velocity, path curvature, etc.) for $t \geq t1$; (3) providing a group of action variable commands, consisting of a roll change within a first specified time interval, a pitch change within a second specified time interval, an altitude change within a third specified time interval, a bank angle within a fourth specified time interval, a heading command within a fifth specified time interval, a thrust command within a sixth specified time interval, and a flight path angle within a seventh specified time interval, for the first aircraft; (4) providing a wait command that commands no change in any action variable for a specified time interval; (5) specifying an action command sequence for the first aircraft that comprises a first action variable command, followed by a first wait command, followed by a second action variable command, followed by a second wait command, followed by a third action variable command, where the action command sequence is chosen so that the first aircraft will arrive approximately at the desired location and orientation relative to the second aircraft at a subsequent time, $t=t2$; and (6) allowing the first aircraft to implement the action command sequence for a time interval subsequent to the time $t=t1$. First and second action command sequences are compared, each of which will cause said first aircraft to arrive approximately at the desired location and orientation relative to the second aircraft at a subsequent time, $t=t2$; and one of the first action command sequence and the second action command sequence is selected as optimal, based upon a selected metric that compares a first value associated with the first action command sequence and a corresponding value associated with the second action command sequence.

BRIEF DESCRIPTION OF THE DRAWINGS

FIG. 10 illustrates bit assignment for maneuver generation.

DESCRIPTION OF BEST MODE OF THE INVENTION

Figure 1:
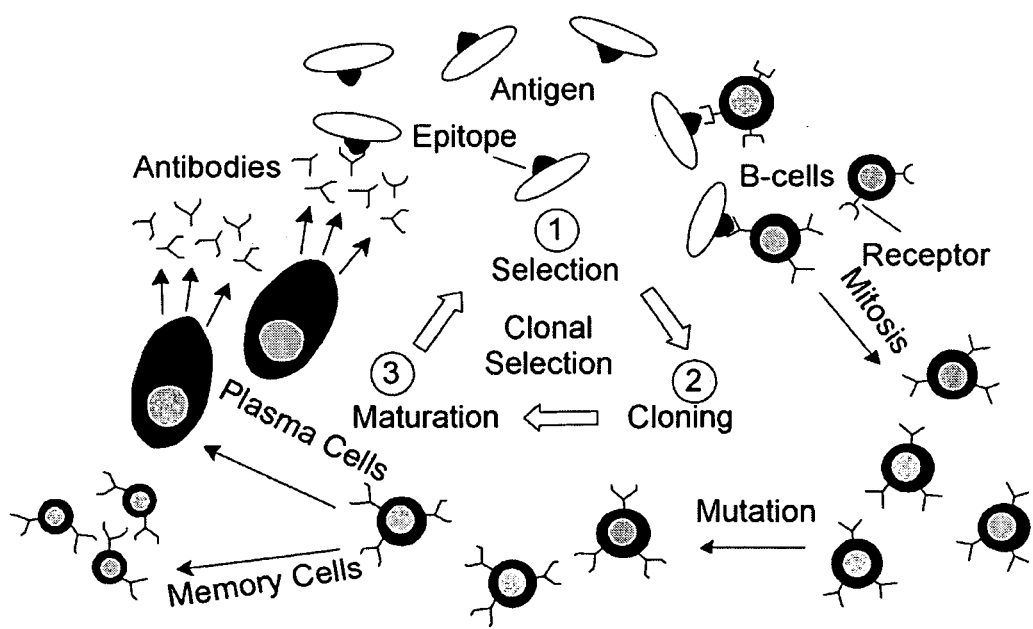
FIG. 1 schematically illustrates immune response system components.

Because future air combat missions will involve both manned and unmanned aircraft, it is of interest to provide unmanned aircraft with intelligent maneuvering capabilities. During air combat maneuvering, pilots use their knowledge and experience of maneuvering strategies and tactics to determine the best course of action. The invention captures these aspects using an artificial immune system (AIS) approach. A biological immune system (BIS) protects the body against intruders by recognizing and destroying harmful cells or molecules. The BIS can be thought of as a robust adaptive system that is capable of dealing with an enormous variety of disturbances and uncertainties. However, another critical aspect of the immune system is that it can remember how previous encounters were successfully defeated. As a result, the system can respond faster to similar encounters in the future. This invention provides an AIS to select and construct air combat or avoidance maneuvers. These maneuvers include autopilot mode and target commands, which represent the low-level building blocks of the parameterized system. The resulting command sequences are sent to a tactical autopilot system, which has been enhanced with additional modes and with an aggressiveness factor for enabling high performance maneuvers. Just as vaccinations train the human biological immune system how to combat intruders, training sets are used to teach an aircraft maneuvering system how to respond to different aircraft configurations. Simulation results are presented, which demonstrate the potential of using immunized maneuver selection for the purposes of air combat and avoidance maneuvering.

A number of technical challenges must be addressed before implementation of an autonomous UAV system. These challenges include situational awareness, three-dimensional mapping, sensor and data fusion, natural language processing, adaptation and learning, image understanding, and human-machine cooperation. The invention provides an application of an AIS to address some of the adaptation and learning challenges that pertain to autonomous Air Combat Maneuvering (ACM). ACM can be described as the art of maneuvering a combat aircraft in order to obtain a position from which an attack can be made on, or avoidance of, another aircraft. This approach relies on offensive and defensive Basic Flight Maneuvers (BFMs) in order to gain an advantage over, or to avoid, another AV. BFMs are the primary maneuvers that can be viewed as the building blocks for ACM, and include accelerations, decelerations, climbs, descents, and turns that can be performed in combination relative to other aircraft.

Pilots use their training and experience of combat tactics, along with their knowledge of aircraft capabilities, to determine which BFMs to perform, and when, and how to implement these maneuvers. A BIS performs a similar role as it protects the body against infectious agents. In this case, intruder aircraft represent the antigens (problems), characterized by their identities, relative positions and velocities. Maneuvers represent the antibodies (solutions) composed of commonly used BFMs. An AIS is used to construct the maneuvers that are necessary for responding to different air combat or air navigation situations. This is accomplished by emulating the adaptive capabilities of the BIS using a combination of genetic and evolutionary algorithms. Another critical aspect of the BIS is that it possesses strong memory retention characteristics. The BIS can remember how previous encounters with antigens were successfully defeated so the system can respond faster to similar situations in the future. This is especially critical for ACM, where split-second decisions can mean the difference between successful and unsuccessful encounters or avoidances. The AIS emulates this ability by establishing a database of successful solutions, and categorizing them according to their problem-to-solution mapping characteristics.

This mapping can be further strengthened over time. The equivalent of vaccinations can be provided through the use of training sets to introduce the AIS to a variety of problems. This represents the equivalent of the training that pilots receive in order to gain the experience necessary for making quick decisions under combat or avoidance situations. The invention provides an immunized maneuver selection methodology, a detailed description of the implementation, and some test results from simulations evaluating one-versus-one maneuvering of similar aircraft. Because the invention focuses primarily on the adaptation and learning challenges of autonomous ACM, it is assumed that relative positions and velocities of adjacent aircraft or other intruders is known. Furthermore, it is assumed that human operators, or other intelligent systems, would be responsible for making strategic oriented decisions such as selecting attack or avoidance formations, determining pre-attack positioning and engagement/disengagement criteria.

2. METHODOLOGY

Immunology is the science of built-in defense mechanisms that are present in all living beings to protect against external attacks. A BIS can be thought of as a robust, adaptive system capable of dealing with an enormous variety of disturbances and uncertainties. During the generation of the immune response, the system receives continuous feedback from the antigen-antibody complex resulting in generation of an increasingly specific antibody response. This represents a learning paradigm that develops solutions that continually increase in accuracy. The AIS models the search for a solution after the generation of an immune response wherein the optimal solution is achieved by rapid mutation and recombination of a genetic representation of the solution space. In this case, genes are represented by a finite number of discrete building blocks that can be thought of as pieces of a puzzle, which must be put together in a specific way to neutralize, remove, or destroy each unique disturbance the system encounters. For ACM, these building blocks consist of BFMs that must be combined and manipulated during immunized maneuver selection.

2.1 Biological Immune System.

The adaptive response of the BIS is driven by the presence of a threat. Cells that most effectively nullify that threat receive the strongest signals to replicate. The basic components of the immune system are white blood cells, or lymphocytes, which are produced in the bone marrow. Some lymphocytes only live for a few days, and the bone marrow is constantly making new cells to replace the old ones in the blood. There are two major classes of lymphocytes: B-cells, which mature in the bone barrow; and T-cells, which travel through the bloodstream to the thymus where they become fully developed as either Helper T-cells or Killer T-cells.

Once B-cells are released into the bloodstream these cells perform immune surveillance. Immune recognition is based on the complementarity between the binding region of B-cell receptors and a portion of the antigen called an epitope. B-cell receptors are essentially non-soluble antibodies that are attached to the B-cells. While all the receptors on a particular B-cell are the same, the unique genetic makeup of each B-cell that is produced in the bone marrow ensures that the receptors from one B-cell to another will be different. FIG. 1 illustrates an immune system response when antigens invade the body. B-cells that are able to bind to antigen become stimulated by Helper T-cells (not shown). Then they begin the repeated process of cell division (or mitosis). This leads to the development of clone cells with the same or slightly mutated genetic makeup. B-cells with the same genetic makeup will have identical receptors. However some B-cells will become mutated, and thus have slightly modified receptors.

This results in the creation of a new B-cell that might have an increased affinity for the antigen. This phenomenon is called "clonal selection" because it is the antigen that essentially selects which B-cells are to be cloned. This will eventually lead to the production of plasma cells and memory cells. Plasma cells mass produce and secrete soluble B-cell receptors that are now called antibodies. These antibodies bind to other antigens to neutralize and mark them for destruction by other cells (e.g., T-cells). Some memory cells can survive for long periods of time by themselves, while other memory cells form a network of similar cells to maintain a stable population. This helps to keep the immune system from extinguishing itself once the antigen has been completely removed.

Another function of the B-cells is to present pieces of antigens, which have invaded cells in the body, to Killer T-cells (also not shown). Killer T-cells destroy the body's own infected cells to prevent them from reproducing and releasing a fresh crop of antigens. However, an autoimmune attack can occur if the immune system responds against substances that are normally present in the body. To protect against this, T-cells undergo a censoring in the thymus, where only the T-cells that do not react against self-proteins manage to survive; the rest are destroyed. This principle of "non-matching" based selection is referred to as negative selection.

2.2 Artificial Immune System

The AIS combines a priori knowledge with the adapting capabilities of a BIS to provide a powerful alternative to currently available techniques for pattern recognition, learning and optimization. It uses several computational models that are based on the principles of the biological immune system. The computational models that are used in this approach are: Bone Marrow Models, Negative Selection, Clonal Selection Algorithm, and Immune Network Model. The utility of these models is grounded in an assumption that some understanding of the problem exists. The available knowledge can then be incorporated into the respective computational models, to be used either individually or in combination. Bone Marrow Model Antibodies and B-cells can be thought of synonymously, because B-cell receptors are essentially antibodies that are still attached to the B-cells. As a result, antibodies can be viewed as being produced from the bone marrow. Bone marrow models incorporate the use of gene libraries to create antibodies through a random concatenation of genes. These genes represent building blocks that have been predetermined, using a priori knowledge, to be pieces of the puzzle that can be put together to form a solution. These building blocks can be simple or complex, and the genetic makeup of the antibodies can be represented as simple binary strings or by more complicated expressions.

2.3 Negative Selection

The process of selecting cells based upon self-versus-non-self discrimination is implemented using the principles of negative selection. In this case, a priori knowledge is used to create detectors that can identify characteristics that would be detrimental for a given situation. A non-matching characteristic discriminator is then used to ensure that only antibodies that do not possess those characteristics are allowed to pass from the bone marrow. The remaining ones are destroyed before ever joining the antibody population in the bloodstream.

2.4 Clonal Selection Algorithm

A distinct difference between biological and artificial evolution is the time scales. The goal of the clonal selection algorithm is to find the most suitable member of a population in a very short period of time. This is accomplished by using selection, cloning, and maturation operators to perform the tasks of discovering and maturing good antibodies from the population in the blood stream. The selection operator uses a fitness function to select the best group of antibodies for a given antigen. The cloning operator is a process in which antibodies with better performance are given a higher probability of reproduction. This reproduction can take the form of creating and manipulating copies of an antibody, or by using genetic operators such as standard or uniform crossover on a pair of antibodies. The maturation operator enhances the ability of the algorithm to tune antibodies in the population. This is performed by the occasional alteration of a particular part of an antibody, using a method called hyper-mutation, or high levels of mutation. Together, these three operators provide an effective mechanism for searching complex spaces. An algorithm is outlined below:

(1) Generate an antibody population either randomly or from a library of available solutions;
(2) Select the n best performing antibody population by evaluating a performance index;
(3) Reproduce the n best individuals by cloning the population;
(4) Maturate a percentage of the antibodies by hyper-mutation;
(5) Re-select the best performing antibody population; and
(6) Stop if an antibody is satisfactory; otherwise, continue again from (1).

2.4 Immune Network Model

The immune network model represents the equivalent of memory cells that form a network to maintain a stable population in the blood stream. Frequent encounters with similar antigen can result in larger more developed networks. In this case, a database is used to store successful antibodies and their corresponding problem-to-solution mappings. This is accomplished by mapping each antibody to the characteristics of the antigen that it neutralizes. When a new antigen enters the body, its characteristics are matched against the strengths of antibodies in the database to select good candidates for seeding the initial population. As the problem-to-solution mappings grow over time, the likelihood that good candidates will be selected, will increase. This results in less time required to find a solution. The database can be initialized off-line using training sets, or by inserting manually constructed antibodies. Alternate problem solving methods can also be used to generate candidate solutions for a particular situation. These candidates would then be translated into antibodies and released into the bloodstream. This provides a powerful means for integrating different techniques in a competitive and complementary fashion. For example, different heuristic approaches can be used to generate additional solutions, which could then be tuned through the process of clonal selection.

2.6 Immunized Maneuver Selection

Figure 2:
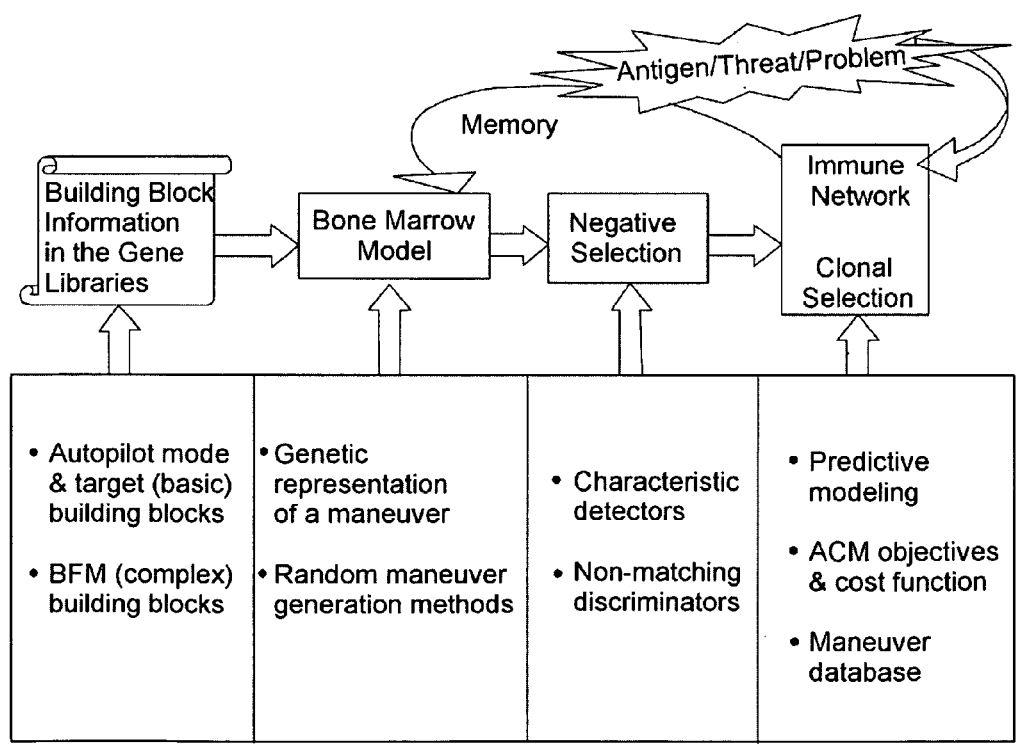
FIG. 2 schematically illustrates selection of an immune system response.

FIG. 2 contains a system level diagram of the artificial immune system's computational models, along with the a priori knowledge that applies it to immunized maneuver selection. In terms of an immune system metaphor, intruder aircraft can be viewed as antigens, whose epitopes are expressed in terms of their relative positions and velocities. B-cells can be viewed as the vessels that carry the antibodies, which in turn represent maneuvers that are used in response to the threat. Each maneuver consists of a sequence of autopilot mode and target commands, and the scheduling time for each command. These autopilot commands represent the basic building blocks that are stored within the gene libraries. These libraries also contain more complex BFM building blocks that have been manually constructed to provide effective autopilot command sequences. Maneuvers are generated through the random selection and concatenation of basic and BFM building blocks. The genetic representation of a simple maneuver with only one autopilot command is expressed in terms of a single binary string. More complex maneuvers with multiple autopilot commands are expressed in terms of multiple binary strings that are linked together.

Once maneuvers have been randomly generated, they are assessed for negative characteristics. Non-matching characteristic discriminators are used to select maneuvers that do not contain these characteristics for survival. This helps to speed up the process of finding a solution by eliminating the need to evaluate poor candidate maneuvers during clonal selection. The evaluation process incorporates autopilot mode dependent models to predict the flight path of the aircraft throughout each maneuver. These models incorporate time-constants and rate limits associated with each autopilot mode, in order to update the aircraft's state without having to rely explicitly on fast-time simulations. A cost function is used to evaluate the performance index of each maneuver by assessing the aircraft's predicted state against specified ACM objectives. These objectives are expressed in terms of weighted parameters that incorporate both rewards and penalties. Rewards are indicated by a negative cost, while penalties are indicated by a positive cost. For example, a large reward may be given for acquiring a firing position on an intruder. Conversely a large penalty may be given for being in the firing position of another intruder. When a successful maneuver is found, it can be stored in a maneuver database for future use.

3. IMPLEMENTATION

Figure 3:
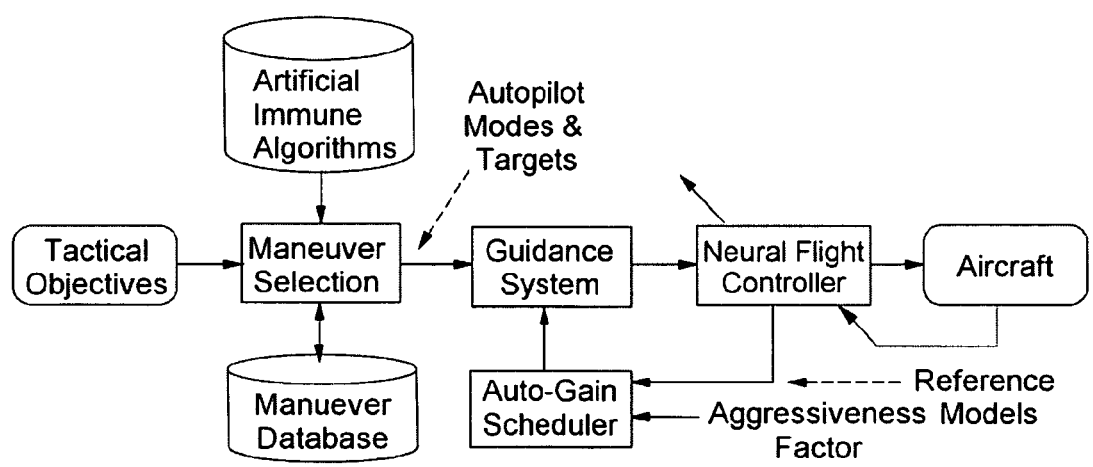
FIG. 3 schematically illustrates a tactical immunized aircraft maneuvering system according to the invention.

This section describes a Tactical Immunized Maneuvering System (TIMS) that uses an AIS approach to construct maneuvers. These maneuvers represent motion-based plans that can be expressed in terms of autopilot command sequences. FIG. 3 presents an overview of the TIMS architecture. The tactical objectives correspond to weighted parameters in a cost function that reflect both desirable and undesirable aircraft states. Maneuver selection is performed using a library of AIS algorithms to select, modify and tune maneuvers that have been randomly generated or retrieved from a maneuver database. Once appropriate maneuvers have been generated, the corresponding autopilot modes and targets are sent to a tactical autopilot system for execution.

The tactical autopilot system is based upon a neural flight controller and auto-gain scheduling guidance system. However, this autopilot has been enhanced with additional body-axis modes and an aggressiveness factor for enabling high performance maneuvers. The command interface has also been modified to process mode and target sequences. The direct adaptive tracking neural flight controller provides consistent handling qualities, across flight conditions and for different aircraft configurations. The guidance system takes advantage of the consistent handling qualities in order to achieve deterministic outer-loop performance. Automatic gain-scheduling is performed using frequency separation, which is based on the natural frequencies of the neural flight controller's specified reference models. The aggressiveness factor is used to limit the percentage of allowable stick and pedal deflections that the guidance system can command. These limits are then propagated throughout the guidance system in the form of computed gains and command limits.

3.1 Maneuver Prediction

During a BFM or sequence of BFMs, the actions a pilot take can be approximated by piece-wise linear or piece-wise constant commands, and the switching between commands. The interconnection of a finite number of commands can be used to generate motion-based plans that can exploit the full maneuvering capabilities of the aircraft. As a result, BFMs can be represented by sequences of autopilot mode and target commands and the time to wait after each command is executed. FIGS. 4A-9B illustrate autopilot commands, along with their possible target values and wait times, associated with some of the maneuvers discussed here.

The commands used in a predicted or actual maneuver include the following: d(roll)=change in aircraft roll angle about longitudinal axis; d(pitch)=change in pitch angle relative to lateral axis; d(alt)=change in altitude relative to intruder aircraft altitude; d(hdg)=change in heading angle; bank=target bank angle; thr=target thrust from responder aircraft engines; fpa=target flight path angle; and wait=explicit wait time interval before beginning next maneuver component.

3.2 Command Sequence Examples

Figure 4A:
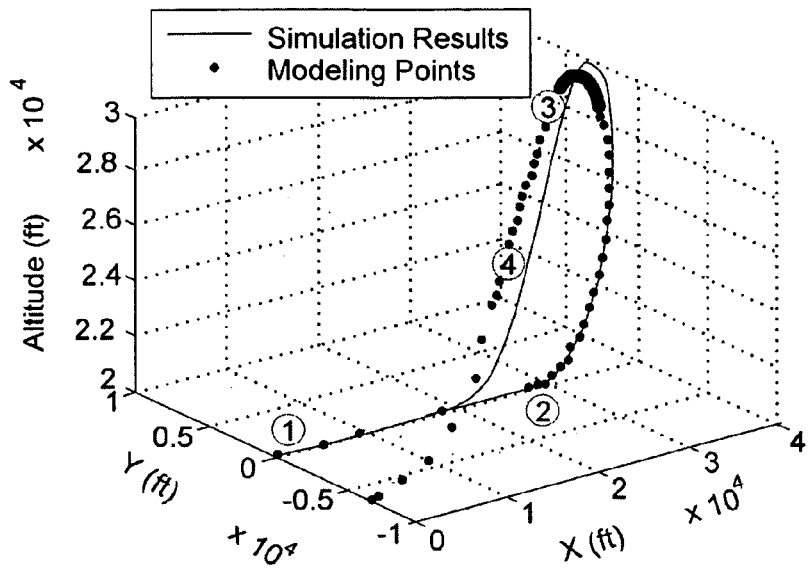
FIGS. 4A and 4B graphically illustrate a "Half-Cuban eight," that can be performed using the invention.
Figure 4B:
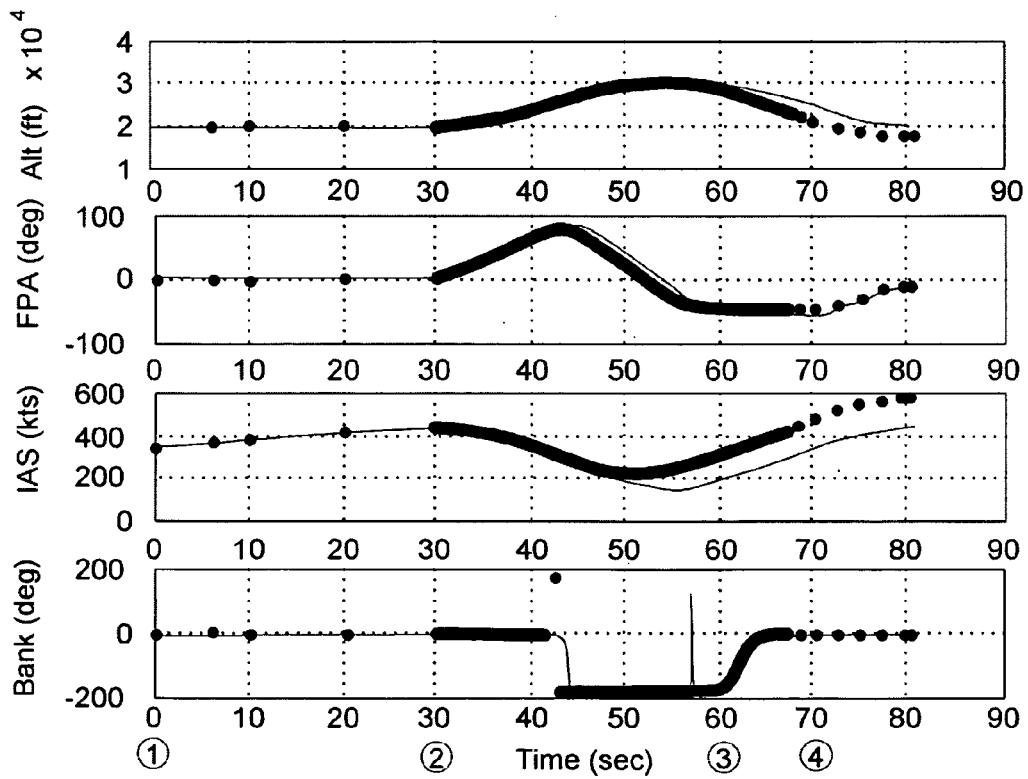

FIG. 4A shows an example of a Half-Cuban-Eight maneuver that is performed on a simulated F-16 aircraft using a sequence of commands to (1) increase to maximum thrust and then wait for airspeed to increase; (2) maintain zero roll rate and control pitch rate (up to maximum normal acceleration) for 225 degrees (in the body-axis) and then allow the G's to unload; (3) bank from −180 to 0° and wait for the aircraft wings to come level; and (4) level off to capture an altitude. The actual command sequence for this maneuver, illustrated graphically in FIG. 4B, is:
    thr=100;
    wait=30;
    d(roll)=0;
    d(pitch)=225;
    wait=30;
    d(roll)=180;
    wait=10;
    fpa=0;
    wait=10.
While this maneuver was constructed manually using a trial-and-error method, the maneuver selection process uses a similar approach by incorporating models to predict the state of the aircraft throughout the maneuver. The accuracy of these predictions is demonstrated by the modeling points (*), which overlay the trajectory of this aerobatic maneuver.

Figure 5A:
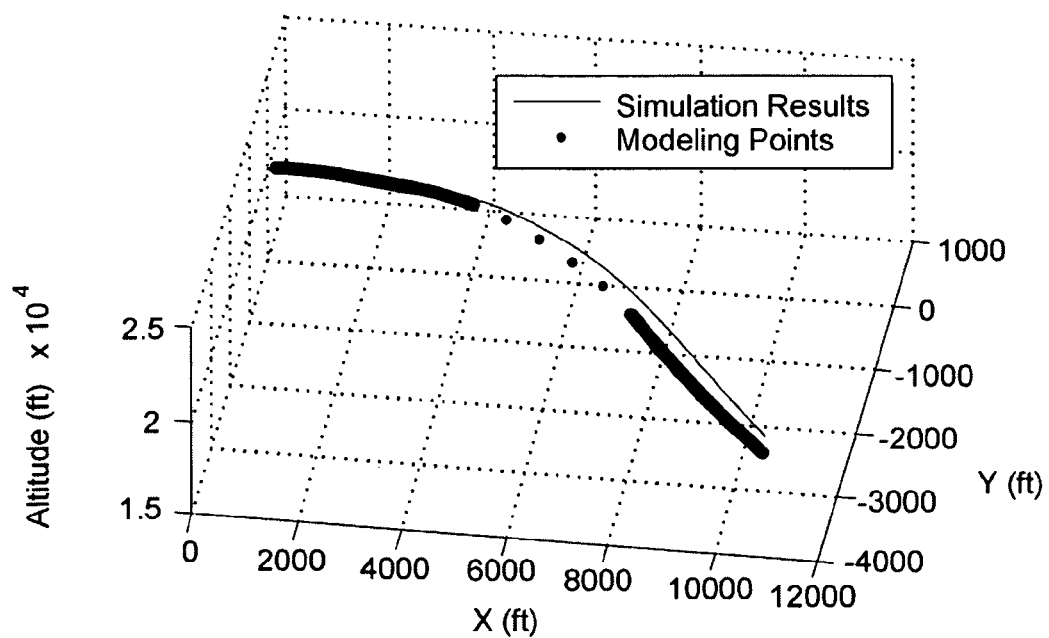
FIGS. 5A and 5B graphically illustrate a right S-turn maneuver that can be performed using the invention.
Figure 5B:
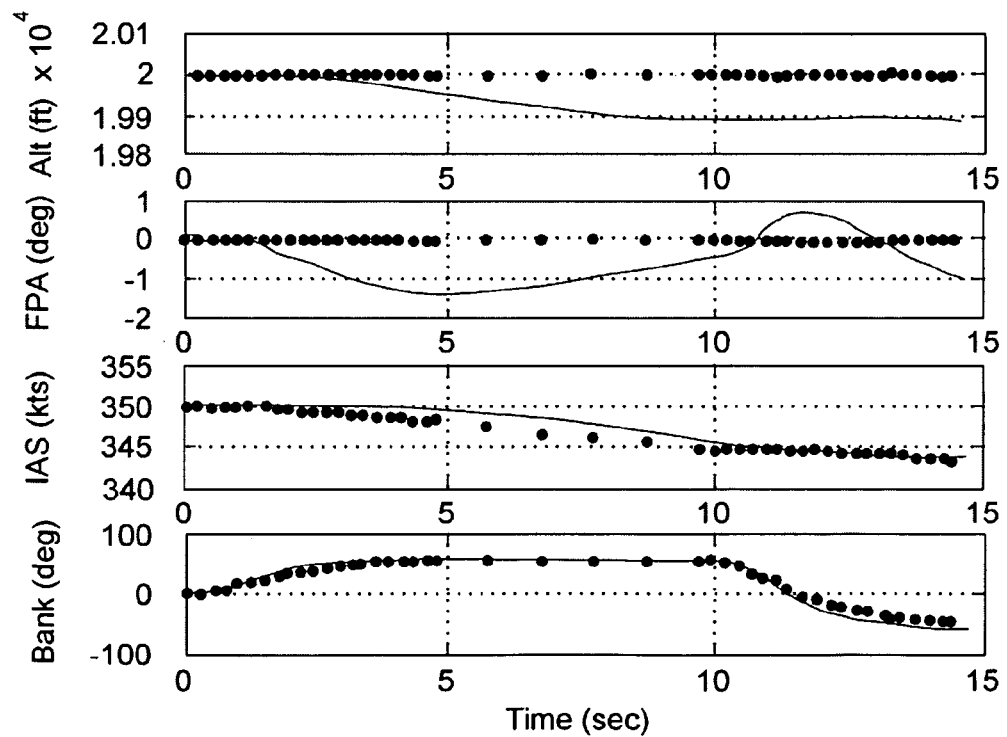

A second maneuver, illustrated in FIG. 5A, is a right S-turn, for which the command sequence, illustrated graphically in FIG. 5B, is:
    bank=60;
    wait=4.7;
    wait=5.0;
    bank=−60;
    wait=4.7.

Figure 6A:
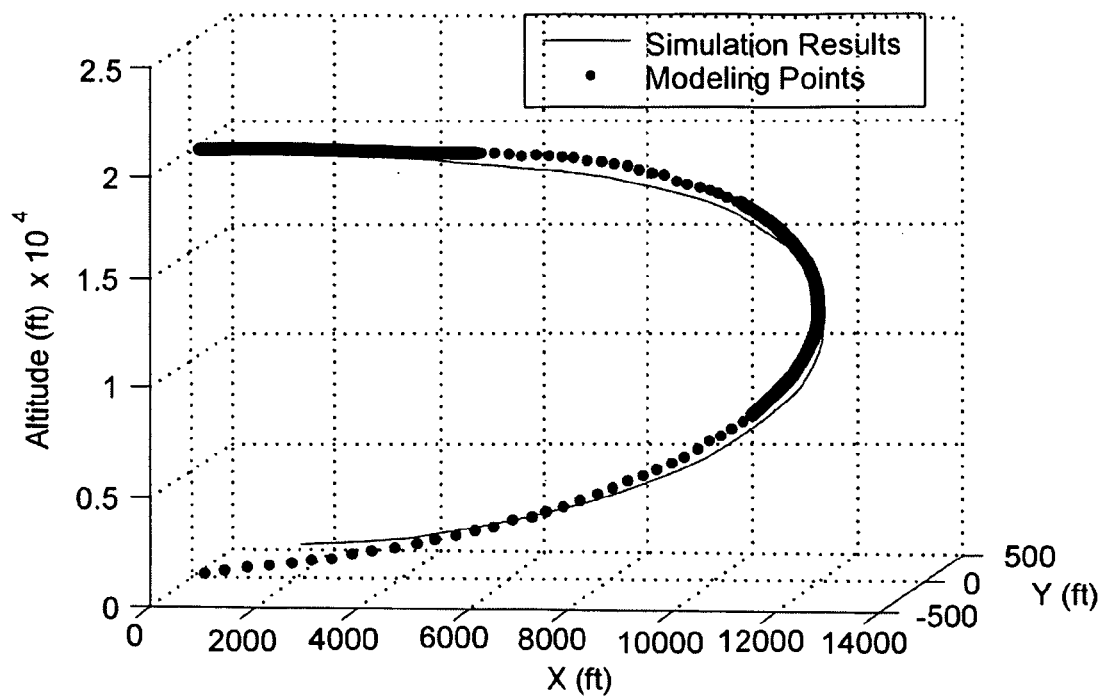
FIGS. 6A and 6B graphically illustrate a split-S maneuver that can be performed using the invention.
Figure 6B:
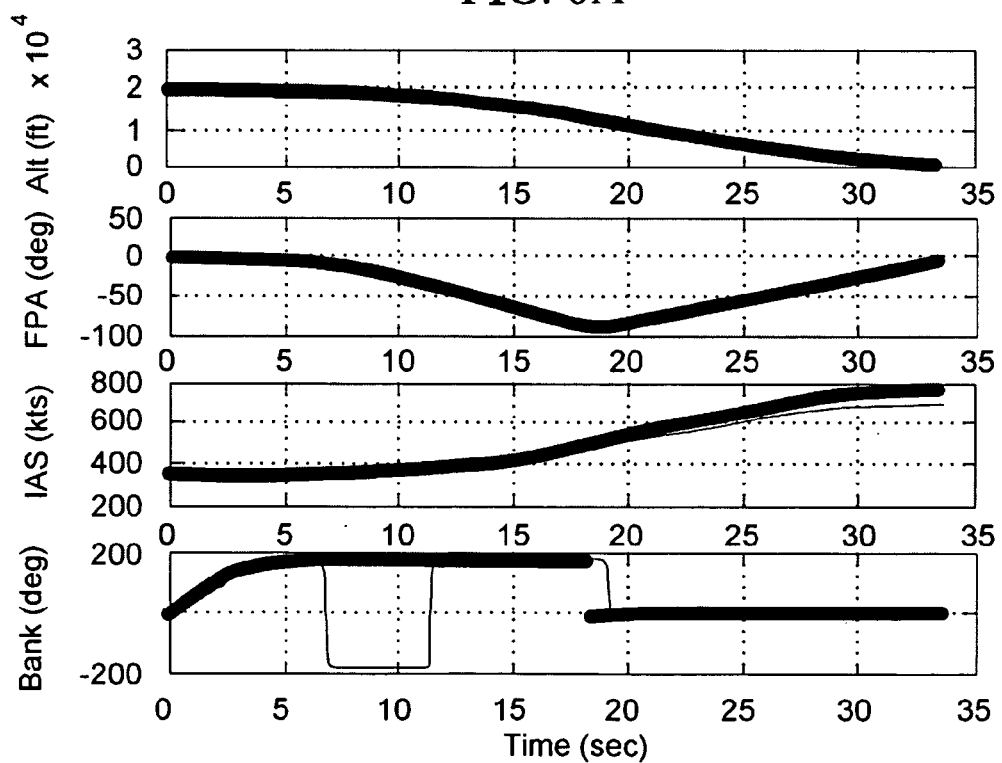

A third maneuver, illustrated in FIG. 6A, is a split-S, for which the command sequence, illustrated graphically in FIG. 6B, is:
    d(roll)=180;
    wait=6.8;
    d(pitch)=180;
    wait=26.5.

Figure 7A:
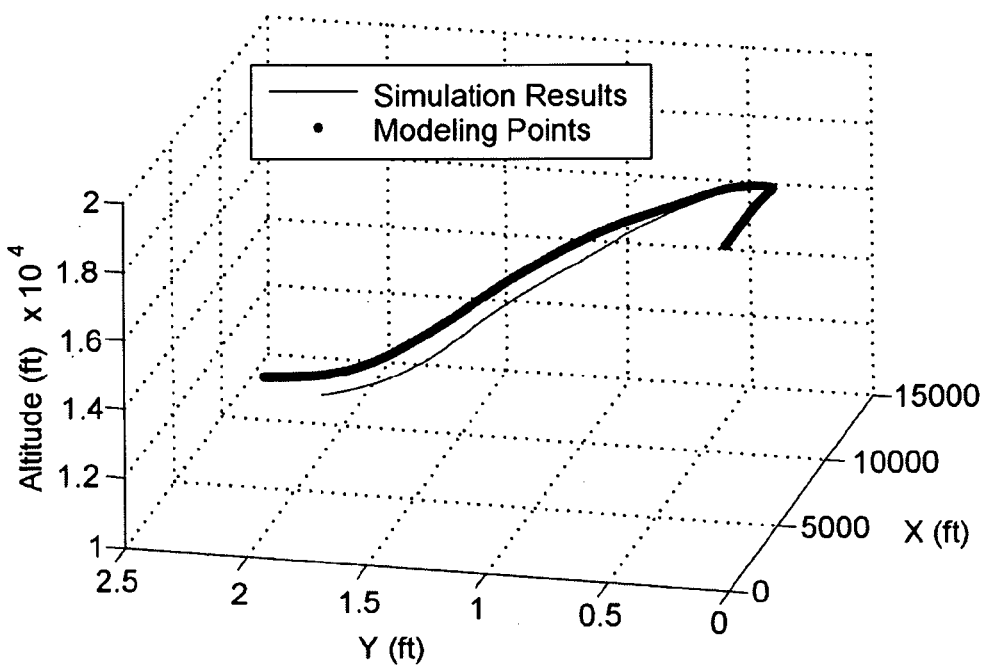
FIGS. 7A and 7B graphically illustrate a horizontal turn maneuver that can be performed using the invention.
Figure 7B:
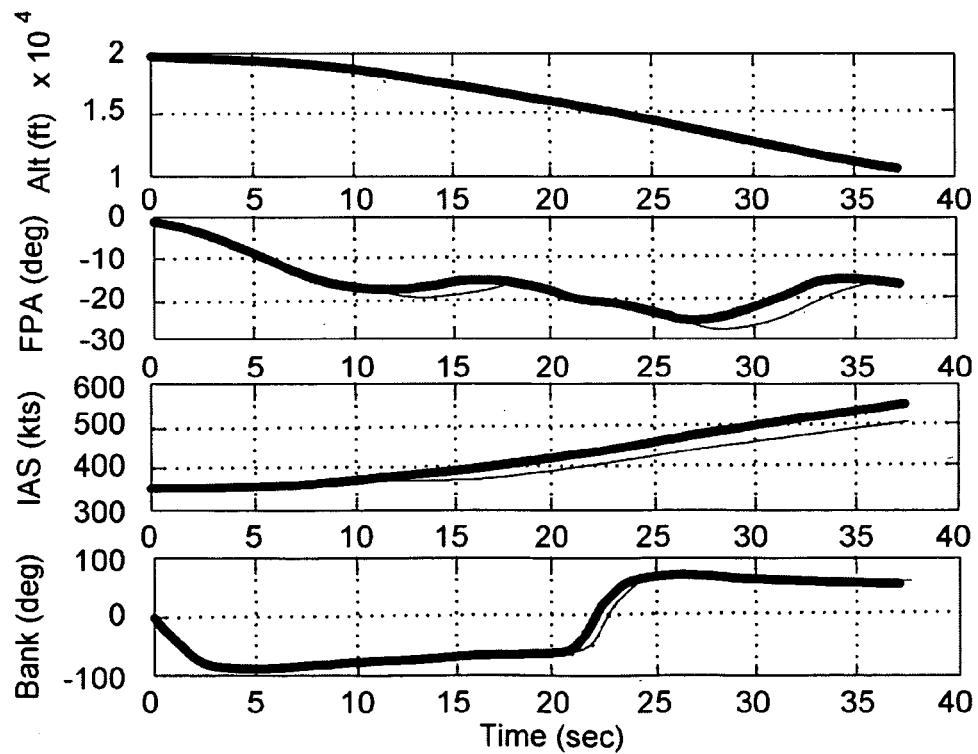

A fourth maneuver, illustrated in FIG. 7A, is a left horizontal turn, for which the command sequence, illustrated graphically in FIG. 7B, is:
    d(roll)=−90;
    wait=5.2;
    d(pitch)=90;
    wait=15.7;
    d(roll)=135;
    wait=6.0;
    d(pitch)=45;
    wait=10.3.

Figure 8B:
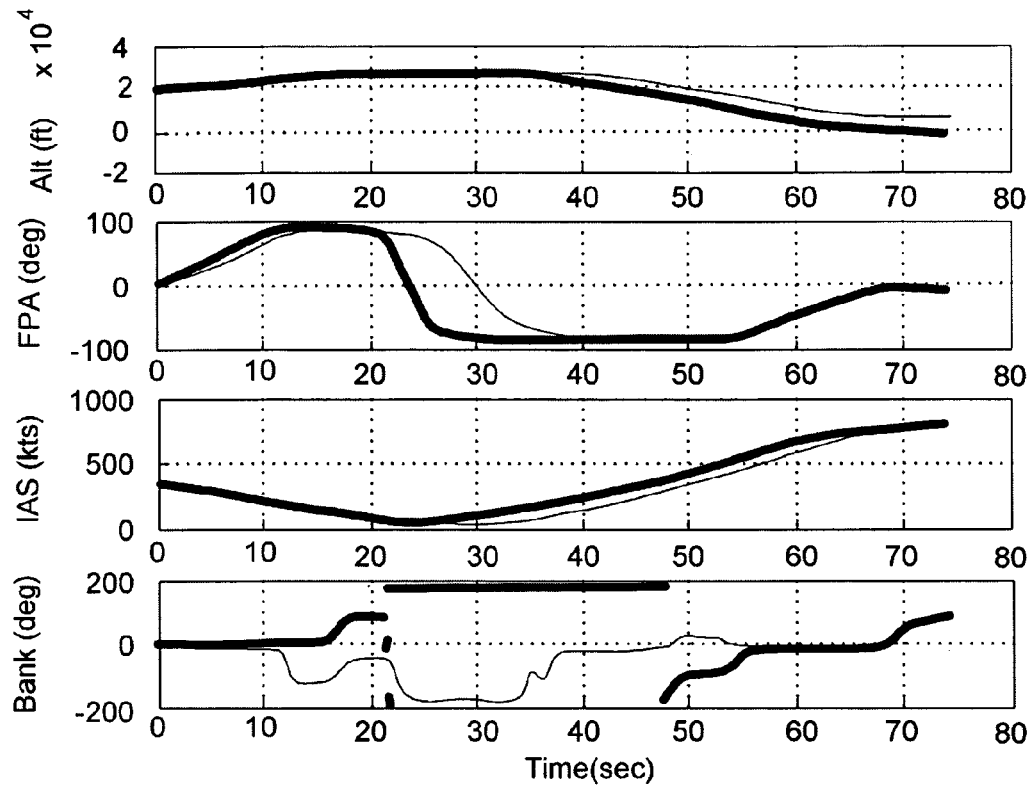
FIGS. 8A and 8B graphically illustrate a vertical turn maneuver that can be performed using the invention.
Figure 8A:
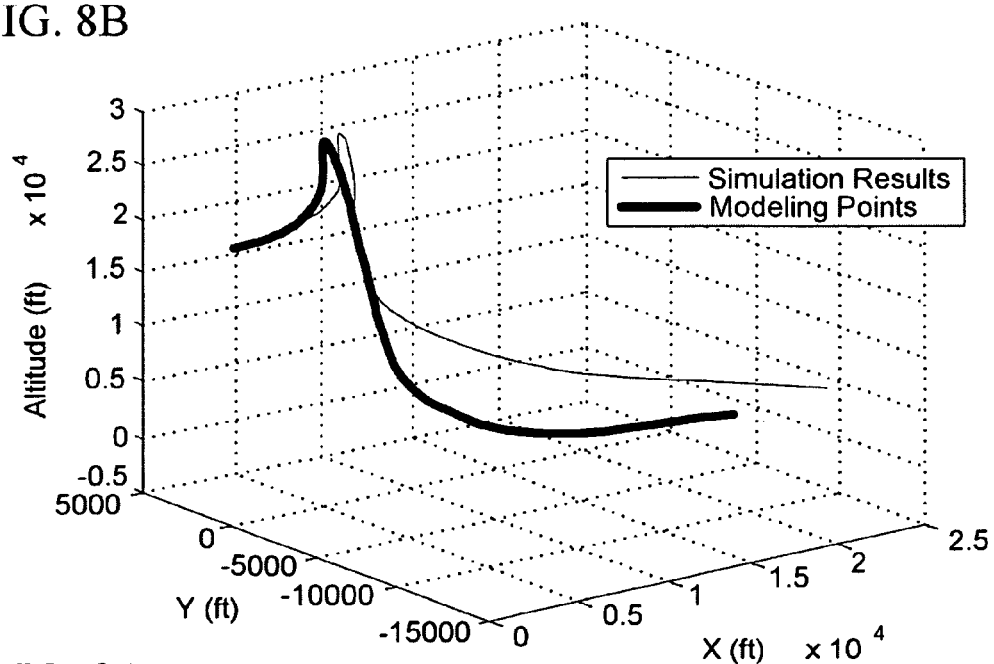

A fifth maneuver, illustrated in FIG. 8A, is a CW vertical turn, for which the command sequence, illustrated graphically in FIG. 8B, is:
    d(pitch)=90;
    wait=15.7;
    d(roll)=90;
    wait=5.2;
    d(pitch)=180;
    wait=26.5;
    d(roll)=90;

wait=5.2;
d(pitch)=90;
wait=15.7;
d(roll)=90;
wait=5.2.

Figure 9B:
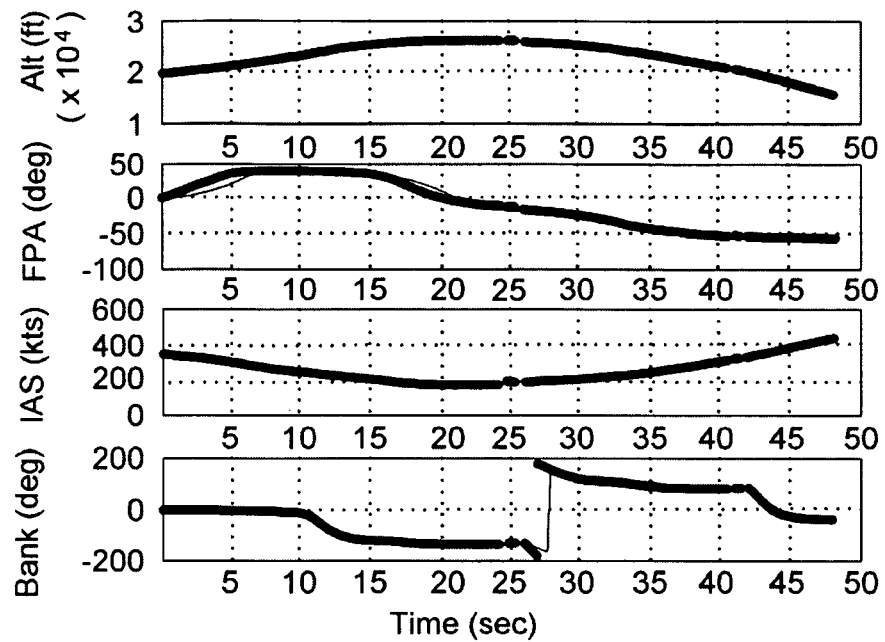
FIGS. 9A and 9B graphically illustrate a counter-clockwise oblique turn maneuver that can be performed using the invention.
Figure 9A:
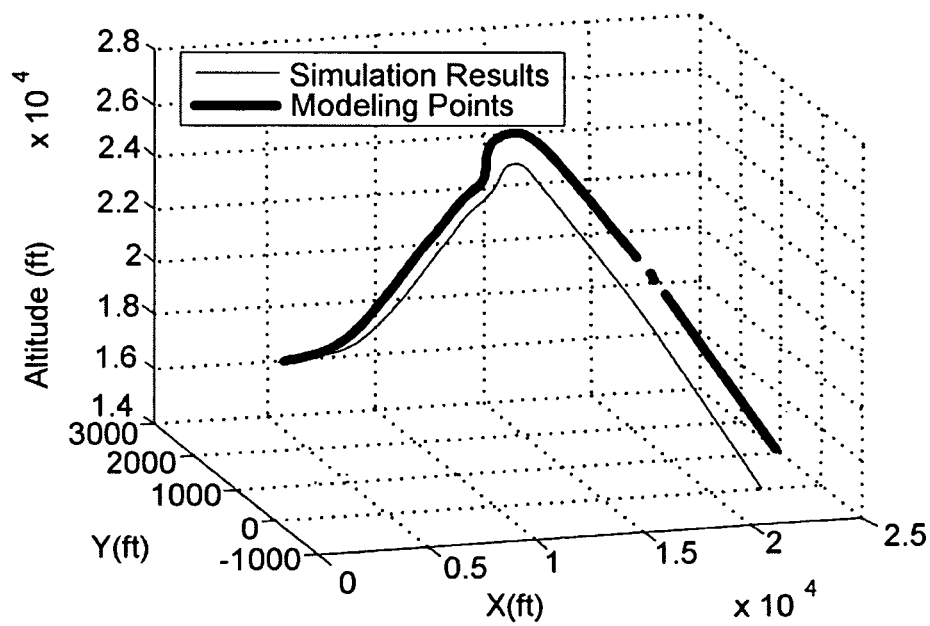

A sixth maneuver, illustrated in FIG. 9A, is a one-third counter-clockwise (CCW) oblique turn, for which the command sequence, illustrated graphically on FIG. 9B, is:
d(pitch)=45;
wait=10.3;
d(roll)=−120;
wait=5.7;
d(pitch)=45;
wait=10.3;
d(roll)=−120;
wait=5.7;
d)pitch)=45;
wait=10.3;
d(roll)=−120;
wait=5.7.

These six examples assume a response aircraft velocity of about 800 ft/sec and can be supplemented by many others, including left S-turn, right horizontal turn, CCW vertical turn, CW oblique turn, and constant bank angle turn. In each of these maneuvers, seven action commands (d(roll), d(pitch), d(alt), d(hdg), bank, thr, fpa) alternate with "wait" commands in order to define and complete the sequence of maneuver components. Optionally, an additional, non-explicit wait time interval is included in each of the eight action commands.

In order to perform iterative predictions of current and future states as fast as possible, the models are simplified by determining the minimum number of points required to sufficiently model each autopilot command. To accomplish this, the modeling of each command is subdivided into a transitional phase and steady state phase. The transitional phase is modeled after a first order response with a rate limit. The steady state phase is modeled by propagating the states. Although the shortest possible time interval to model the transitional phase was determined to be one time-constant (which corresponds to a minimum wait time), the desired duration is three times the time-constant (or potential rate limits that are encountered). Therefore, the duration of the transitional phase ($T_{trans}$), for an arbitrary state (X) that is commanded to a value ($X_c$) with a rate limit (±X(dotmax)), can be computed as $$T_{trans} = 3\tau + |X_c - X|/|X_{dotmax}| \quad (1)$$

Using Eq. (1), the longest possible time interval to model the transitional phase (which corresponds to a maximum wait time) can be determined using the target range in place of the commanded state versus actual state ($X_c$-X). Because at least two modeling points were determined to be necessary for modeling each time-constant interval, the corresponding time-step ($N_{trans}$) required for computing the transitional phase can be computed as $$N_{trans} = [0.5 + 2T_{Trans}/\tau]_{int}, \quad (2)$$

where $[w]_{int}$ is the integer part of the real number w (e.g., $[-4.3]_{int}=-5$, $[7.6]_{int}=7$).

The steady-state phase is modeled in a similar fashion, although no controlled states need to be updated. As a result, the steady state phase can be modeled with a minimum of two points, and can have a much larger time-step. When computing states over a step-size, Earth-axis modes are propagated by maintaining bank and flight path angles. Additional logic is also incorporated to model the autopilot recovery response in situations, such as reaching normal acceleration limits, where the attitude is no longer capable of being maintained. Body-axis modes are propagated by maintaining pitch and roll body-axis rates. In both cases the heading, airspeed, altitude and position are updated. The predicted modeling points versus actual simulation data, for the Half-Cuban-Eight maneuver displayed in FIG. 4, demonstrates that significantly more time points are necessary to compute a transitional phase. The final predicted position at the end of the maneuver was in error laterally by only 300 feet, and in error longitudinally by about 10,000 feet (or roughly 10 sec). The primary difference is that the predicted airspeed was faster than actual airspeed by approximately 135 knots, which resulted in a predicted altitude that was lower than true altitude by almost 2,400 feet.

3.3 Maneuver Assessment

Once maneuvers can be adequately predicted for a desired response, aircraft, performance can be evaluated against a cost function. The cost function is expressed in terms of weighted parameters, which represents rewards (negative costs) and penalties (positive costs) relative to tactical objectives. The performance index of a maneuver is computed by adding up all of the rewards and penalties, based upon the predicted states of the aircraft and intruder. They are organized into large (±1000), medium (±100), and small (±10) categories. The large category is incorporated to ensure that the safety of the aircraft is not compromised. The medium category represents the primary tactical objectives, and the small category is used to influence the optimization process.

For this evaluation, the medium rewards were issued for obtaining a firing position on, or a desired displacement from, an intruder aircraft by the end of the maneuver. The corresponding medium penalty is assessed for being in the firing position of the intruder. However, the distance penalty is not incorporated, because this would only serve to cancel the corresponding reward. The small penalties consisted of time factors to encourage completion of a maneuver within 30-60 sec, and to ensure that sufficient time is allocated for waiting after issuing an autopilot command so that the transition phase could be accurately modeled. Large penalties were assessed for flying outside of a defined flight envelope. While many of these values were notional, they were incorporated as a means of determining their impact. In the event of achieving a successful firing position or displacement, three medium level rewards would be issued. As a result, a maneuver can be considered completely successful when the performance index approaches −300. This is one of the methods used to determine an exit criterion during the process of maneuver selection.

3.4 Maneuver Selection

The genetic representation of an autopilot command is expressed in terms of a binary string, which is stored in a 32-bit word. Three bits (24-26) are used to identify eight autopilot command numbers. The target and wait ranges for each command are divided into eight different regions. Three bits (20-22) are used to identify the target regions, and three bits (16-18) are used to identify the wait regions. Finally, each region is subdivided into 256 different parts to provide the necessary resolution for computing precise target values and wait times. Eight bits (8-15) are used to express the precision factor for each target region, and eight bits (0-7) are used to express the precision factor for each wait region. The remaining seven spare bits are reserved. FIG. 10 illustrates one assignment of the 32 bits for maneuver generation.

The binary string for an autopilot command, once established, can be linked with other binary strings to form more complex maneuvers. For this evaluation, a maximum of ten autopilot commands were allowed per maneuver. The maneuvers were constructed through random generation and concatenation of autopilot commands and manually constructed BFMs. Only a select number of BFMs were constructed for this evaluation.

For this evaluation, a population of 100 maneuvers is initially selected and maintained throughout the selection, cloning and maturation processes. Unless a maneuver with an "acceptable" performance index (PI<−280) is found, a maximum of 100 generations would be computed before returning the best available maneuver in the population.

3.5 Initial Selection Process

The initial selection process consisted of randomly generating maneuvers from autopilot commands and BFMs, and by selecting maneuvers from the maneuver database. The maneuver database contained 500 successful maneuvers that were generated off-line using training sets that varied the relative altitude (±10000 ft), flight path angle (±10 deg/sec), heading (±180°), distance (0-10 nm) and bearing (±180°) of the intruder. When a successful maneuver is found, it is placed into the database along with the corresponding relative position and velocity characteristics. In an intelligent selection process, before the maneuver database is initially accessed, the strength of each maneuver is assessed by comparing the characteristics of the maneuver against those of the current situation. The differences are weighted and added together to compute a corresponding strength index SI. These strengths are then sorted and used to randomly select maneuvers from the database, using a normal distribution to give stronger maneuvers a higher probability of selection. To provide the greatest chance of success, the maneuver with the highest strength index is automatically inserted into the initial population. To preserve continuity, the remaining portion of the currently executing maneuver is also placed into the initial population. Once the maneuvers have been placed into the population, they are evaluated against the cost function and sorted according to their performance index.

3.6 Cloning Process

During the cloning process, the bottom 25 percent of the population is "replaced" by offspring produced through genetic mutation. This involves using a normal distribution to randomly select maneuvers from the population. A copy of each selected maneuver is then subjected to: (1) insertion of an autopilot command, randomly generated maneuver, or maneuver selected from the maneuver database; (2) removal of an autopilot command; (3) standard or uniform bit level crossover operators; or (4) standard or uniform custom crossover operators. The custom crossover operators involved the swapping of modes, target and/or wait regions, and precision factors instead of individual bits.

3.7 Maturation Process

During the maturation process, the top 10 percent of the population is matured through random evolution. This involved subjecting a copy of a maneuver to the random replacement of target and/or wait regions, or precision factors for each autopilot command in the maneuver. The maneuver is evaluated and compared against the original maneuver. If there is an improvement in the performance index, then the original maneuver is replaced.

3.8 Re-Selection Process

During the re-selection process, the middle 65 percent of the population is at risk of being replaced by "newcomers" that are generated in a fashion that is similar to initial selection. The primary difference is that the newly generated maneuvers have to survive the process of negative selection. This is accomplished by evaluating the performance of each new maneuver to determine whether or not they exceed the performance of the bottom 25 percent of the population. Maneuvers that would fall into the bottom 25 percent category are deleted. This is because they would have little chance of survival beyond the next cloning process. However, maneuvers that would not fall into the bottom 25 percent category survive by replacing one of the maneuvers in the middle 65 percent of the population. This is performed even if the new maneuver does not exceed the performance of the maneuver it is going to replace. This is because the addition of the new maneuver can provide a level of diversity into the population.

4. RESULTS

Simulation tests were performed to evaluate one-versus-one maneuvering of similar aircraft using a high fidelity model of an F-16 aircraft. The aircraft is initialized flying straight and level at an altitude of 20,000 feet and with an indicated airspeed of 350 knots. A Dryden turbulence model is used to provide light turbulence with RMS and bandwidth values representative of those specified in Military Specifications Mil-Spec-8785 D, issued April 1989. The Earth atmosphere is based on a 1976 standard atmosphere model.

4.1 Convergence Test

Figure 11A:
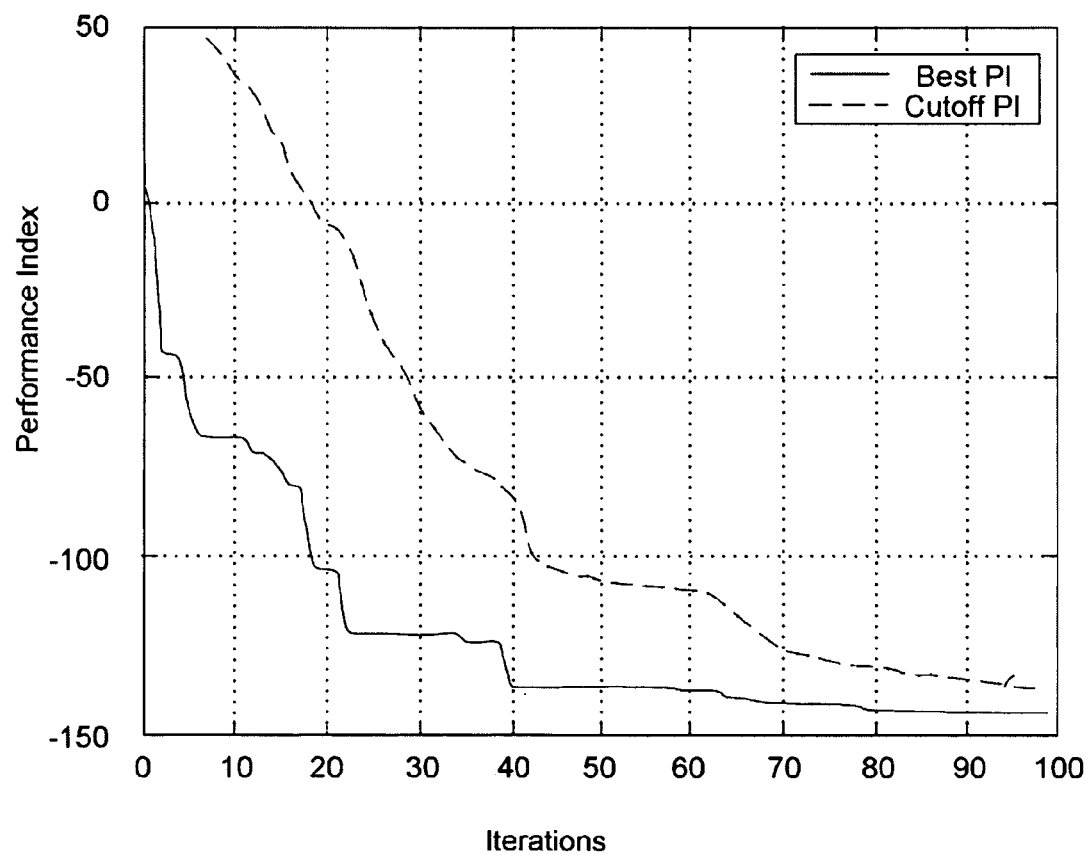
FIGS. 11A and 11B graphically illustrate results of a convergence test performed on the invention.
Figure 11B:
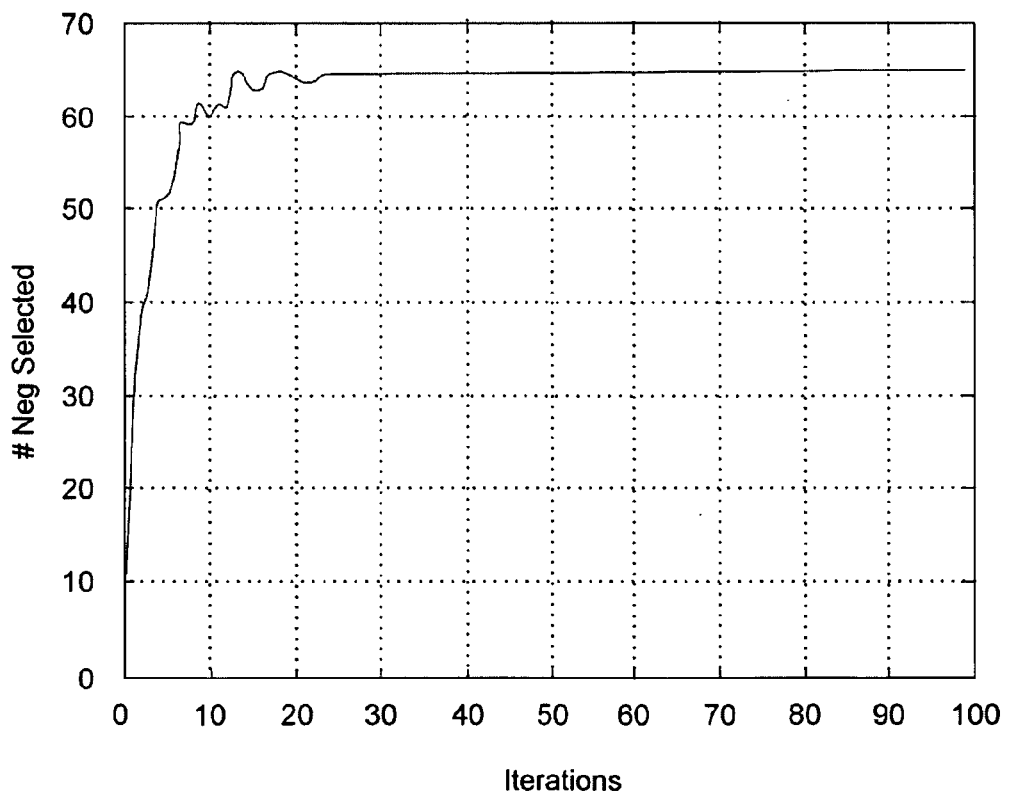

One of the driving factors behind the selection of the population size and number of generations to compute is so that solutions could be found within 1-2 seconds. To ensure that the specified number of generations is sufficient, the rate of convergence in the population is evaluated. FIGS. 11A and 11B demonstrate the results from one of the more difficult convergence tests, where the aircraft is initialized far away from the intruder so that the performance index is less responsive to differences between maneuvers.

The best performance index (Best PI) in the population converges quickly to a solution, and appears to go through a slight maturation process after 40 iterations. This may be an indication that the number of generations could potentially be decreased even further. However, the performance index that is used as the cutoff point for negative selection (Cutoff PI) also converges very quickly. This may be an indication that there is not enough diversity in the population, since only a few randomly generated maneuvers manage to survive the process of negative selection after 20 iterations.

4.2 Static Testing

Figure 12A:
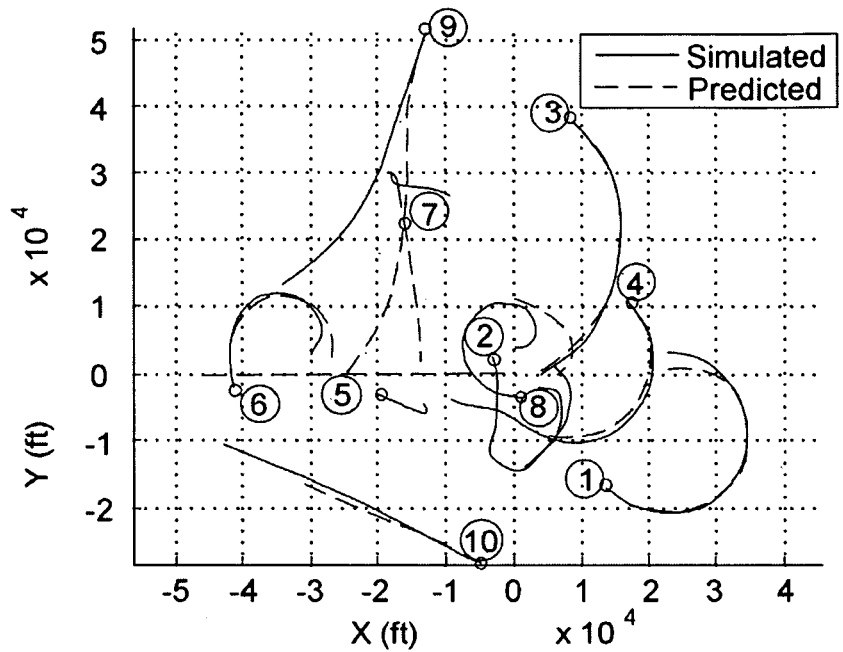
FIGS. 12-14 graphically illustrate responses to a sequence of maneuver commands using the invention.
Figure 12B:
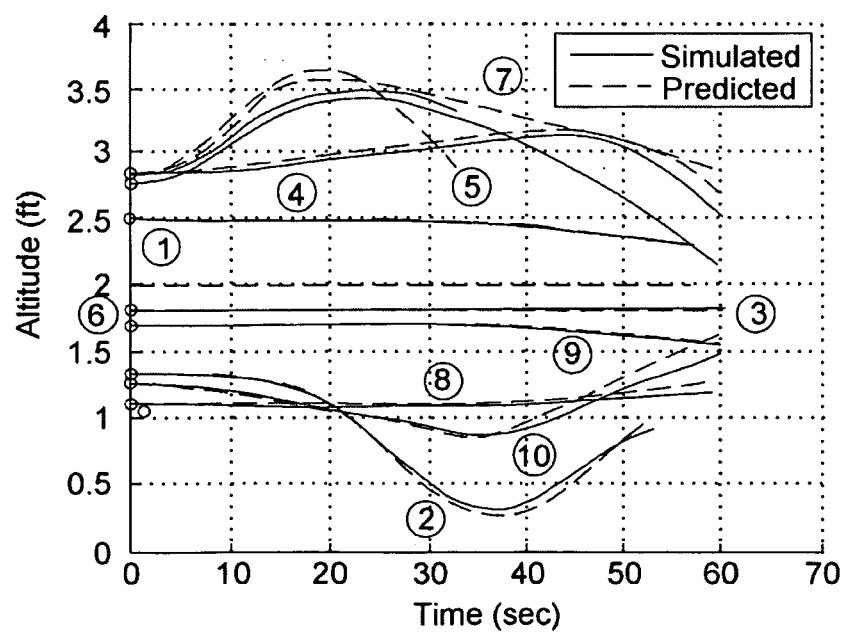

Monte Carlo testing is performed in order to evaluate the effectiveness and accuracy of the maneuvers. Test cases consisted of the same intruder flying eastwards, straight and level at 20,000 feet. The aircraft is also initialized flying straight and level, but in random directions and at different positions and altitudes around the intruder. FIG. 12 presents ten test cases that demonstrate the effectiveness of the predicted maneuvers. However, in some test cases (such as #7) the prediction does not match the simulated trajectory. This is especially problematic for situations where the aircraft pitches up beyond 90° (as in the Half Cuban Eight maneuver), where insufficient airspeed can result in unmodeled dynamics that can significantly alter the final state.

4.3 Dynamic Testing

The choice of a maneuver, expressed as an ordered sequence of BFMs, is chosen from a population of BFM sequences, based upon one or more optimization criteria, which may include elapsed time required for the responder aircraft to reach a desired location and orientation relative to the predicted near term flight path (NTFP) of the intruder. In most instances, this elapsed time will range from 2 to 60 sec, with a smaller elapsed time generally being preferred. This selection of an optimal maneuver will occur in a time interval length, ranging from fractions of a sec to as much as 2 sec. The time interval length is dependent upon the number of iterations required to find a solution, and cannot be predicted, but is limited by a maximum of 100 iterations in one embodiment.

Where the intruder aircraft deviates from the predicted NTFP, for example, where the intruder aircraft takes evasive action during a response aircraft maneuver, the system will re-select a new optimal responder path, which may be the preceding NTFP maneuver or may be a new maneuver, based on a new determination of maneuver optimality. This re-selection of maneuver, based on the most current information on intruder aircraft NTFP, occurs about once every five sec. To preserve continuity, the unexecuted portion of the preceding maneuver is included in the initial population of 100 BFM sequences, which are evaluated and used to construct the new maneuver. With the passage of time, the maneuvers become more refined and allow use of shorter time interval lengths to selected the optimal maneuver.

Figure 13:
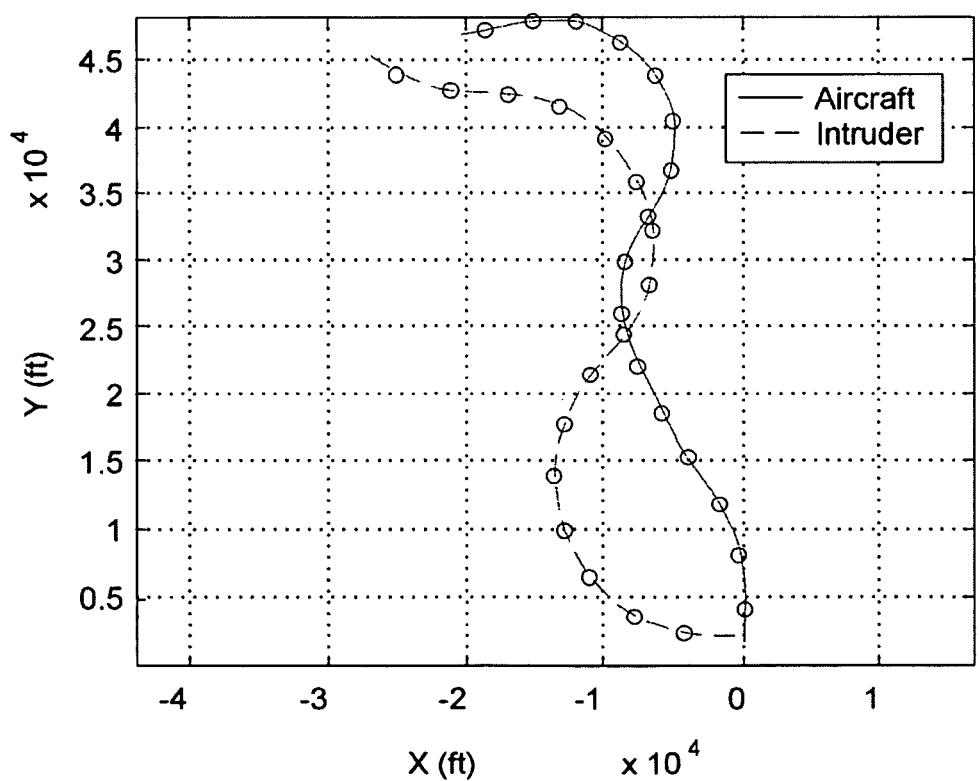
Figure 14:
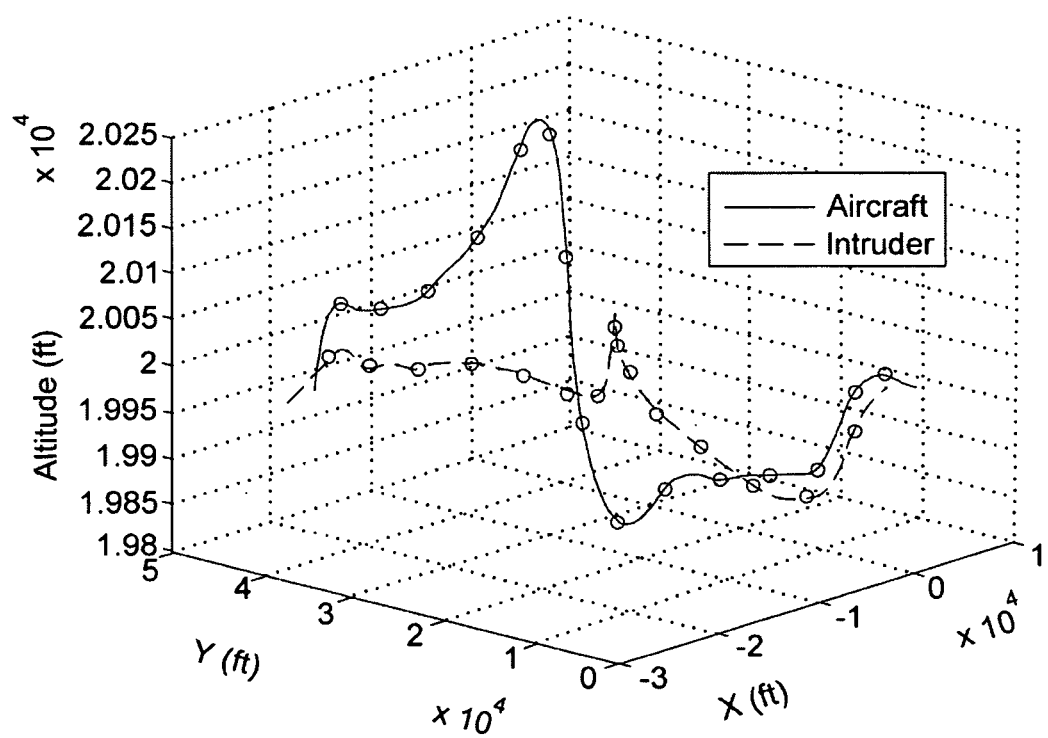

Dynamic testing is performed by allowing maneuvers to be re-computed every 5 sec (or another selected duration), in response to changes in the intruder's trajectory or flight configuration. During the lateral tests, the intruder performed a series of 60° bank angle maneuvers in an approximation of the "flat scissors" technique. During the coupled (lateral and vertical) tests, the intruder performed a series of 60° bank angle and 5° flight path angle maneuvers, in an approximation of the "rolling scissors" technique. FIGS. 13 and 14 present results from a lateral test case (FIG. 13) and a coupled lateral-plus-vertical test case (FIG. 14). In both cases, circles have been placed at 5-second intervals along the trajectories. In general, the lateral tests were found to produce reasonably deterministic results. However, the coupled tests often resulted in vertical overshoots caused by over-aggressiveness. This could potentially be traced back to the lack of derivative terms in the cost function.

5. CONCLUSIONS

The purpose of this evaluation is to demonstrate the effectiveness of using an artificial immune system approach for ACM. Test results demonstrate the potential of immunized maneuver selection, in terms of constructing effective motion-based trajectories over a relatively short (1-2 sec) period of time. In most cases, the trajectories were adequately predicted with minimal computation to enable iterative calculations. However, further research is still required in terms of improving the cost function implementation, and tuning convergence rates so that a diverse population is maintained. Additional development is also necessary to improve aspects of the predictive modeling, and to manage the execution of recalculated maneuvers during real-time operation.

What is claimed is:

1. A method for control of an aircraft relative to one or more other aircraft, the method comprising:

providing a first airborne aircraft, having a first aircraft processor and associated processor memory unit that autonomously observes and evaluates present location and on present velocity of a second airborne aircraft relative to the first aircraft at a first time value t1, where the processor infers that the second aircraft appears to follow a flight configuration that is non-cooperative with, or evasive relative to, the first aircraft;

causing the first aircraft processor to estimate a first desired location and a first desired orientation of the first aircraft relative to the second aircraft at a second time value t2 that is greater than the first time value t1, where the processor is configured to assume that the second aircraft will continue the present orientation and present velocity of the second aircraft for a first time interval, that extends from the time value t1 to the time value t2;

providing a group of action-commands for the first aircraft processor, drawn from a group of action variable commands comprising: a roll angle change within a first specified time interval, a pitch angle change within a second specified time interval, an altitude change within a third specified time interval, a bank angle command within a fourth specified time interval, a heading command within a fifth specified time interval, a thrust command within a sixth specified time interval, and a flight path angle command within a seventh specified time interval, for the first aircraft;

providing a wait command for the first aircraft processor that commands that the first aircraft make no change in any action variable for an eighth specified time interval, which may have zero time interval length;

providing an action command sequence (ACS) for the first aircraft processor that comprises a first action variable command, followed by a first wait command, followed by a second action variable command, followed by a second wait command where the first and second action variable commands are drawn from a group of action commands and the action command sequence is constructed so that the first aircraft will arrive at the first desired location and the first desired orientation relative to the second aircraft at the second time value t2; and causing the first aircraft to implement the action command sequence for a first time interval which extends from the time value t1 to the time value t2, so that the first aircraft arrives at the first desired location and the first desired orientation relative to the second aircraft at the second time value t2.

2. The method of claim 1, further comprising:

providing a training set for said first aircraft processor, comprising first and second candidate action command sequences of action variable commands for said first aircraft, where each of the first and second candidate action command sequences will cause said first aircraft to arrive at said desired location and said desired orientation relative to said second aircraft at said second time value, t2;

comparing said first candidate action command sequence and said second candidate action command sequence with each other, using said first aircraft processor, by comparing a first action value associated with the first candidate action command sequence with a corresponding second action value associated with the second candidate action command sequence; and based upon comparison of the first and second action values, causing said processor to select one of the first candidate action command sequence and the second candidate action command sequence, as a first optimal action command sequence for said first desired location and said first desired orientation of said first aircraft relative to said second aircraft at said second time value, t2.

3. The method of claim 2, further comprising:

causing said first aircraft processor to estimate a second desired location and a second desired orientation of said first aircraft relative to said second aircraft at a third time value t3, which is greater than said second time value t2, where said processor is configured to assume that said second aircraft will continue present orientation and present velocity for said second aircraft for a second time interval, which extends from said second time value t2 to the third time value t3;

providing for said first aircraft processor a second training set, comprising a third candidate action command sequence of said action variable commands and said first optimal action command sequence, where each of the third candidate action command sequence and said first optimal action command sequence will cause said first aircraft to arrive at the second desired location and the second desired orientation relative to said second aircraft at the third time value t3;

causing said first aircraft processor to compare the third candidate action command sequence and said first optimal action command sequence with each other, by comparing a third action value associated with the said first optimal action command sequence with a corresponding fourth action value associated with the third candidate action command sequence; and causing said first aircraft processor to select one of the third candidate action command sequence and said first optimal action command sequence as a second optimal action command sequence to that will cause said first aircraft to arrive at the second desired location and the second desired orientation relative to said second aircraft at the third time value t3.

4. The method of claim 1, further comprising causing said first aircraft processor to estimate a subsequent flight path for said second aircraft using at least one of a group of flight configurations comprising: a flight path with constant velocity vector; a flight path with constant bank angle; a flight path with-constant curvature; a flight path in a horizontal plane with a constant curvature; and a flight path in a vertical plane with constant curvature.

5. The method of claim 1, further comprising providing said action command sequence for said first aircraft processor from at least one of a group of action command sequences comprising: a Half-Cuban-eight maneuver; a right S-turn maneuver; a left S-turn maneuver; a split-S maneuver; a left horizontal turn maneuver; a right horizontal turn maneuver; a clockwise vertical turn maneuver; a counter-clockwise vertical turn maneuver; a clockwise oblique turn maneuver; and a counter-clockwise oblique turn maneuver.

\* \* \* \* \*